US007421699B2

(12) United States Patent
Brendle et al.

(10) Patent No.: US 7,421,699 B2
(45) Date of Patent: Sep. 2, 2008

(54) SERVICE META MODEL FOR AN ENTERPRISE SERVICE ARCHITECTURE

(75) Inventors: Rainer Brendle, Neckargemünd (DE); Thomas Fiedler, Pfinztal (DE); Holger Meinert, Muehlhausen (DE)

(73) Assignee: SAP AG, Walldorf (DE)

( * ) Notice: Subject to any disclaimer, the term of this patent is extended or adjusted under 35 U.S.C. 154(b) by 617 days.

(21) Appl. No.: 11/007,049

(22) Filed: Dec. 8, 2004

(65) Prior Publication Data

US 2006/0129974 A1 Jun. 15, 2006

(51) Int. Cl.
*G06F 3/00* (2006.01)
*G06F 9/44* (2006.01)

(52) U.S. Cl. ...................... 719/310; 717/108
(58) Field of Classification Search .............. 719/310; 717/108

See application file for complete search history.

(56) References Cited

U.S. PATENT DOCUMENTS 5,918,052 A * 6/1999 Kruskal et al. .............. 717/100
6,691,299 B1 * 2/2004 Hart et al. ................... 717/108

\* cited by examiner

*Primary Examiner*—Meng-Ai An
*Assistant Examiner*—Lechi Truong
(74) *Attorney, Agent, or Firm*—Finnegan, Henderson, Farabow, Garrett & Dunner LLP

(57) ABSTRACT

Methods and apparatus, including computer program products, for defining and using a service meta model operate on a meta model that includes an object node class, an association class, and an object class. The object node class includes a key identifier and represents data types. The association class is associated with the object node class and represents an association between instances of the object node class. The object class is associated with an object composition. The object composition is defined by a data structure of instances of the object node class and associations between the instances of the object node class represented by the association class.

15 Claims, 9 Drawing Sheets

SERVICE META MODEL FOR AN ENTERPRISE SERVICE ARCHITECTURE

BACKGROUND

The present invention relates to data processing by digital computer, and more particularly to a service meta model for an enterprise service architecture.

The design process for complex software applications generally begins with constructing a model of the software architecture. In an object-oriented design process, for example, a model allows a designer to define the structure and interaction of a large number of software modules before actual software coding begins. The development of a model can also promote reuse of modules within an application (or between applications) by facilitating an organized representation of the application. The ability to reuse modules can also facilitate at least partially automated application code generation. For example, if a model for a new application reuses software modules from a prior application, it is possible to automatically generate some of the code for the new application by using the code from the prior application.

An application can be modeled, for example, using the Unified Modeling Language (UML) to create a visual representation of the application. Models defined using UML can easily be translated into metadata that can be stored in a repository (e.g., using Extensible Markup Language (XML) Metadata Interchange (XMI)). Web services and/or applications that implement web services can be modeled using a UML class diagram, which can be converted into Web Services Description Language (WSDL) to describe the mechanics of interacting with a particular web service. WSDL provides a framework for describing a web service by defining message types, interfaces, operations, and bindings.

SUMMARY OF THE INVENTION

The present invention provides methods and apparatus, including computer program products, that implement techniques for modeling a service-based application architecture.

In one general aspect, the techniques feature interacting with data conforming to a data model. The data model includes an object node class, an association class, and an object class. The object node class includes a key identifier and represents data types. The association class is associated with the object node class and represents an association between instances of the object node class. The object class is associated with an object composition. The object composition is defined by a data structure of object node class instances and associations between the instances of the object node class represented by the association class.

The invention can be implemented to include one or more of the following advantageous features. The data model includes a core service interface class including one or more operations. The core service interface class is associated with the object node class and represents a set of interface patterns. The data model includes a service interface class including one or more operations. The service interface class is associated with the object class and represents a service interface constructed from one or more instances of the core service interface class. The core service interface instances are associated with one or more instances of the object node class included in the object composition. An instance of the service interface class includes parameters defining one or more instances of the object node class and one or more related instances of the core service interface class. The service interface class includes one or more interface patterns.

The service interface class comprises an extension of the core service interface class. Each interface pattern in the set of interface patterns includes a reusable interface template. The set of interface patterns includes interface patterns for creating instances of the business object node class, retrieving instances of the business object node class, updating instances of the business object node class, deleting instances of the business object node class, performing an action on instances of the business object node class, searching for instances of the business object node class, and/or navigating between instances of the business object node class. The object node class includes a plurality of attributes. One or more instances of the object node class include a generalization of a reusable instance of the object node class.

The invention can be implemented to realize one or more of the following advantages. A model of a service-based application architecture can be used, even by non-programmers and business-oriented users, to allow service-providing components to be easily combined into full applications and business processes. The model provides a metadata description of all of the basic services that can be used within a service-based application architecture. Tools can be developed to support the construction of applications and business processes by non-technical users using a model that arranges services around and attaches services to business objects. Service descriptions can include parameters for the services to allow tools to determine which services can be included in which process steps. Service interfaces can be described using interface patterns that define the services available for each business object and for each component within a business object. By using interface patterns and providing rich service descriptions, tools can automatically perform many of the tasks normally performed by a programmer. One implementation of the invention provides all of the above advantages.

Details of one or more implementations of the invention are set forth in the accompanying drawings and in the description below. Further features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
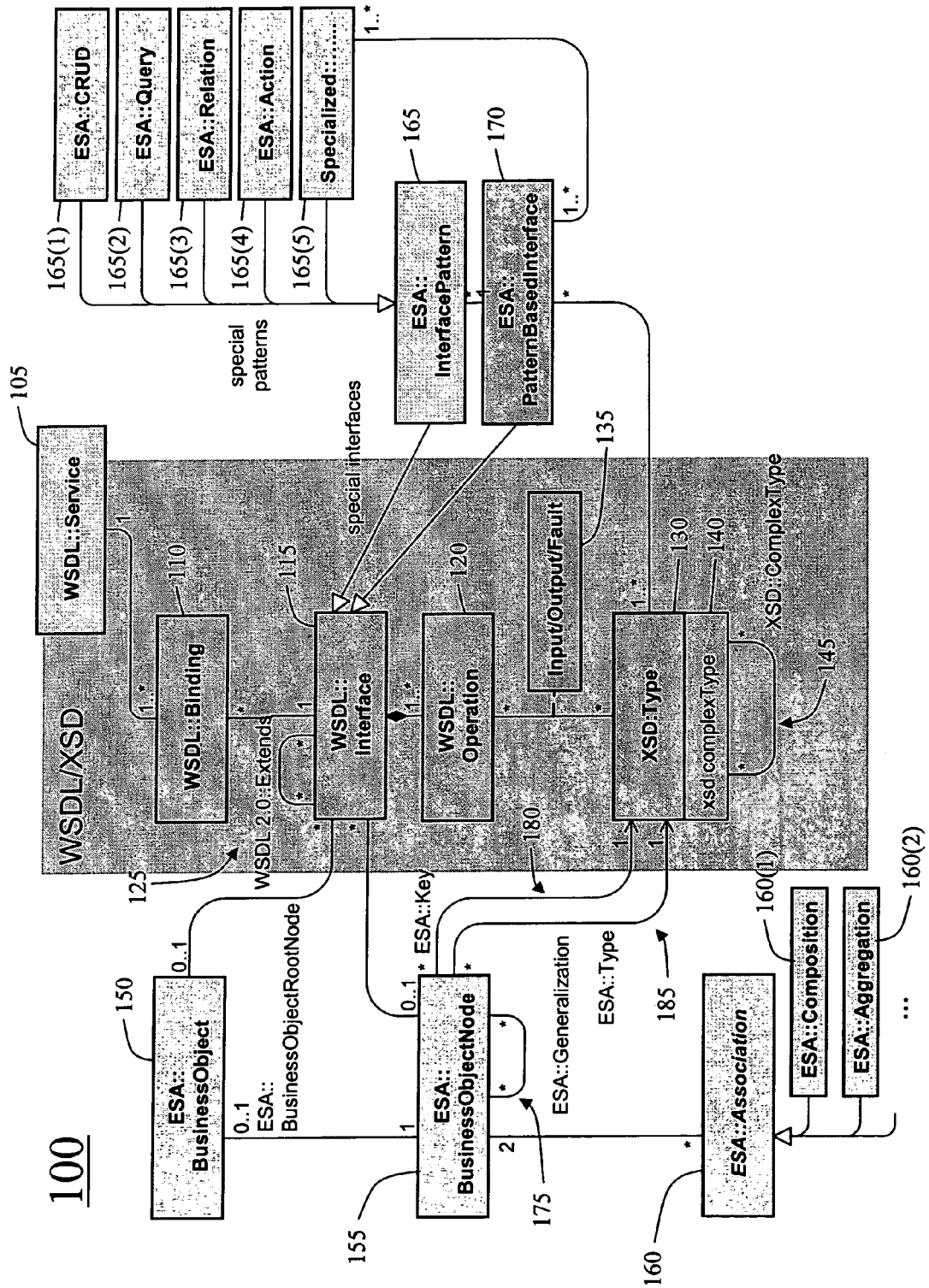
FIG. 1 is a service meta model class diagram.

As shown in FIG. 1, a service meta model class diagram 100 combines elements for modeling an enterprise service architecture (ESA) with elements of WSDL and XML Schema Definition (XSD). The service meta model class diagram 100 complies with UML class modeling. WSDL defines a service class 105, a binding class 110, an interface class 115, and an operation class 120. The service class 105 is used for listing locations (i.e., endpoints) where a described web service can be accessed. An instance of the service class 105 is a callable resource that exists only after a runtime configuration. Each service is associated with one or more instances of the binding class 110. The binding class 110 describes how to access a web service by specifying protocols for interacting with an interface. Each interface is an instance of the interface class 115 and describes the abstract functionality of the web service with respect to the types of messages the service sends and receives. Each interface may be callable by several different bindings. In accordance with WSDL 2.0, one or more instances of the interface class 115 can be extended (125) by one or more other instances of the interface class 115 (i.e., to incorporate elements of one or more interfaces into another interface). Each interface includes one or more instances of the operation class 120. An operation describes a sequence of messages that can be exchanged with the web service. Operations are associated with message types, as defined by an XSD type class 130, which describe the messages that a web service can send and receive. Messages may include input, output, and fault messages (as indicated at 135). Instances of the type class 130 can include complex types 140, which include (145) other instances of the type class 130 (e.g., sub-elements), and simple types, which include values but do not include sub-elements.

The enterprise service architecture includes a business object class 150, a business object node class 155, an association class 160, an interface pattern class 165, and a pattern based interface class 170. Each instance of a business object class 150 is associated with instances of the interface class 115 that define which interfaces include operations relating to the business object. For example, an interface for creating a purchase order can be associated with a generic purchase order business object, which can be instantiated as a specific business object using the interface. The business object class 150 is associated with a business object root node of the business object node class 155. The business object node class is also associated with the interface class 115 to define which interfaces include operations pertinent to each business object node. In some cases, a business object node is-associated with a generalization (175) of an element, which itself is a business object node. Generalizations provide reusable model elements that can be specialized for particular contexts. In some cases, generalization may be applicable for purposes of modeling and defining which interfaces relate to a business object node but not for automatic inheritance of attributes in an implementation of the business object node.

The business object node class 155 is associated with the type class 130 to define a key (as indicated at 180) and a data type (as indicated at 185) for each business object node. The key is a value or attribute used as a unique identifier for the business object node, and the data type defines the elements and/or the format of data (e.g., the types of attribute values) for the business object node. Each instance of the business object node class 155, including the business object root node, is associated with other business object nodes through instances of the association class 160. Associations combine business object nodes into a related graph and thus define possible navigation paths within and across business objects. The association class 160 includes a composition association class 160(1) and an aggregation association class 160(2). Other subclasses of the association class 160 can also be defined. Instances of composition associations 160(1) relate sub-object nodes with a parent business object node (e.g., relating business object nodes that define the elements of a business object to a business object root node). Accordingly, business object nodes along with associated composition associations provide a model of a business object. Instances of the aggregation association class 160(2) define relationships between business object nodes, either within a particular business object or across different business objects. For example, an aggregation association may be defined between a line item in a purchase order and a product referenced in the line item.

The interface pattern class 165 provides reusable interface patterns. An interface pattern describes a specific purpose and behavior of an interface and includes an interface template, which describes a structure for implementing the interface within a service. Interface patterns are used to implement "core services," which define basic operations that can be performed on business objects and business object nodes. Interface patterns implementing core services include a "CRUD" pattern 165(1), which provides services to create, retrieve, update, and delete ("CRUD") instances of business object nodes; a query pattern 165(2) to search and find instances of business object nodes; a relation pattern 165(3) to navigate from one instance of a business object node to other business object node instances; and an action pattern 165(4) to initiate state transitions on instances of business object nodes. Specialized patterns 165(5) for implementing other core services can also be defined.

Interface patterns 165(1)-(5) that implement core services represent special instances of the interface pattern class 165. These special instances further provide special core services interfaces within the interface class 115. The special core services interfaces are associated with the business object node class 155 for purposes of defining core services that can be used with or on each instance of a business object node. Query interfaces (i.e., instances of the query pattern 165(2)) and relation interfaces (i.e., instances of the relation pattern 165(3)), and the services in which the interfaces are implemented, relate to instances of the association class 160 that are associated with business object nodes. Query interfaces allow searches for instances of business object nodes using attributes of a searched business object node (i.e., the business object node with which the query interface is associated) and/or attributes of business object nodes associated with the searched business object node (i.e., through an instance of the association class 160). Relation interfaces allow navigation from one instance of a business object node to another instance of a business object node along a defined instance of the association class 160.

The core services interface patterns 165(1)-(5) can be selectively combined into specialized interface patterns 165(5) associated with the pattern based interface class 170. Instances of the pattern based interface class 170 are used, for example, to provide services for a business object (e.g., services that impact or rely upon multiple business object nodes and/or their associated core services). The pattern based interface class 170 is associated with the type class 130 for defining interface types.

A business object is a semantic grouping of core services and non-core services that is associated with a tree of business object nodes, which describe the data model of the business object. Accordingly, business objects are represented as complex structures rather than single nodes in a graph. The business object nodes include associated core services, which together form the core services of the business object. Additional services, both pattern-based and non-pattern-based, can also be defined and associated with the business object. Typically, the core services and the additional services use parts of the business object node graph (i.e., business object nodes, their data types, keys, and attributes, and the associated core services) as data types for constructing the parameters of the operations of each service, and implementations of the additional services combine the core services into a new functionality.

Although illustrated in FIG. 1 as a service meta model class diagram 100, the service meta model can also be represented using XML (e.g., using a specialized XSD that includes definitions of the entities discussed above). The service meta model includes a set of metadata attributes that further define characteristics of the various entities in the meta model. The service meta model can be converted between a class diagram format and an XML representation using XMI. Instance documents of the service meta model also can be defined using XML. Tools can use the metadata structure to identify the functions that can be performed on or using data retrieved from or provided to services described in accordance with the meta model. For example, a user interface modeling tool can identify the manner in which data should be displayed and any further operations that can be provided on data types.

Figure 2:
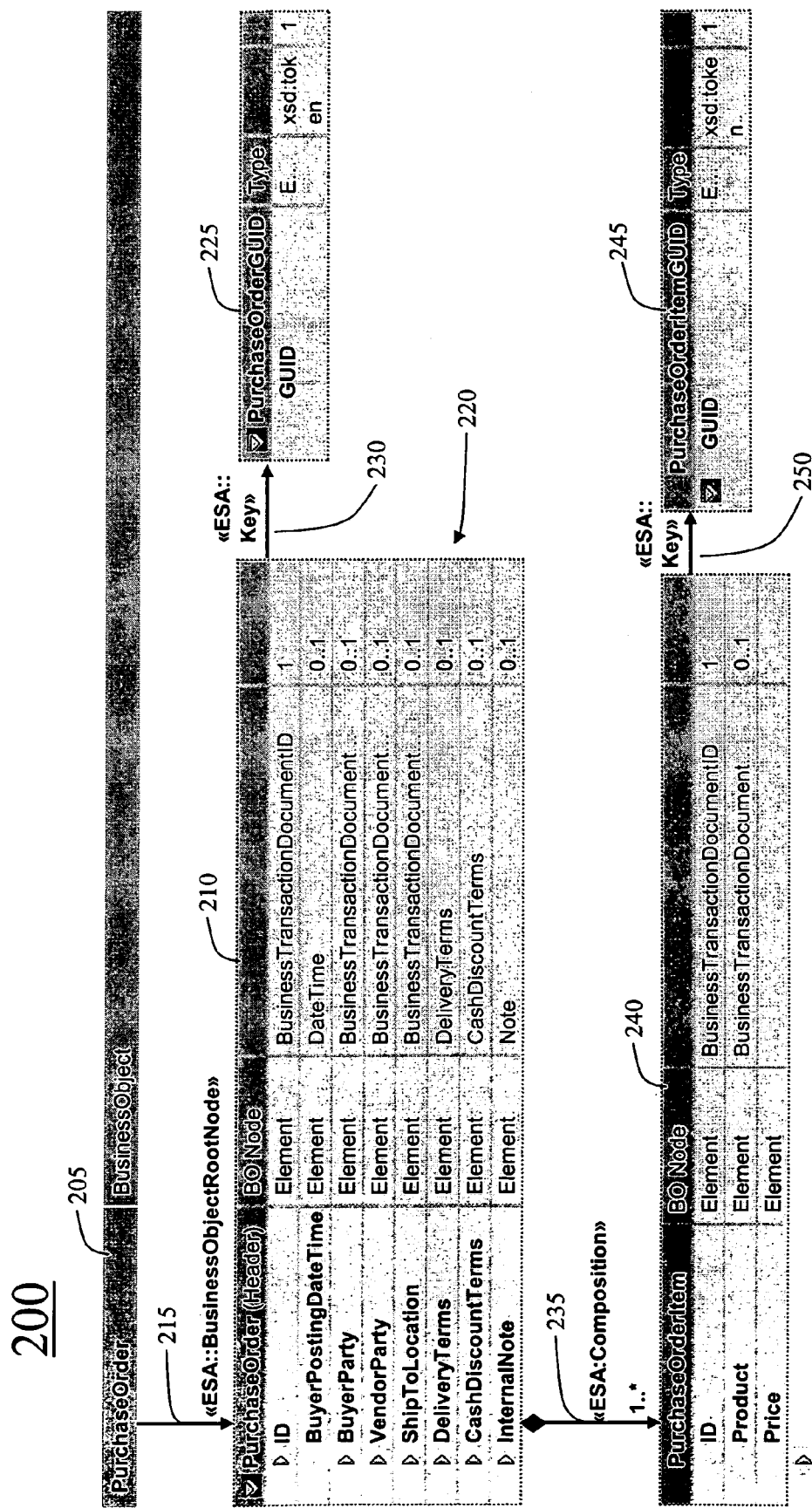
FIG. 2 is an example of a business object model constructed in accordance with the service meta model.

As shown in FIG. 2, a business object model 200 includes an instance 205 of a business object class associated with a header instance 210 of a business object node class using a business object root node association 215. In this case, the business object 205 represents a purchase order. The header business object node 210 serves as a header for the business object 205 and includes multiple elements 220, which are structured according to a complex data type for a purchase order header. The header business object node 210 also has a key 225 as defined by a key association 230. The header business object node 210 is associated through a composition association 235 with one or more business object nodes 240 (e.g., for purchase order items). The business object nodes 240 are each structured according to a data type and include a key 245 as defined by a key association 250.

Figure 3:
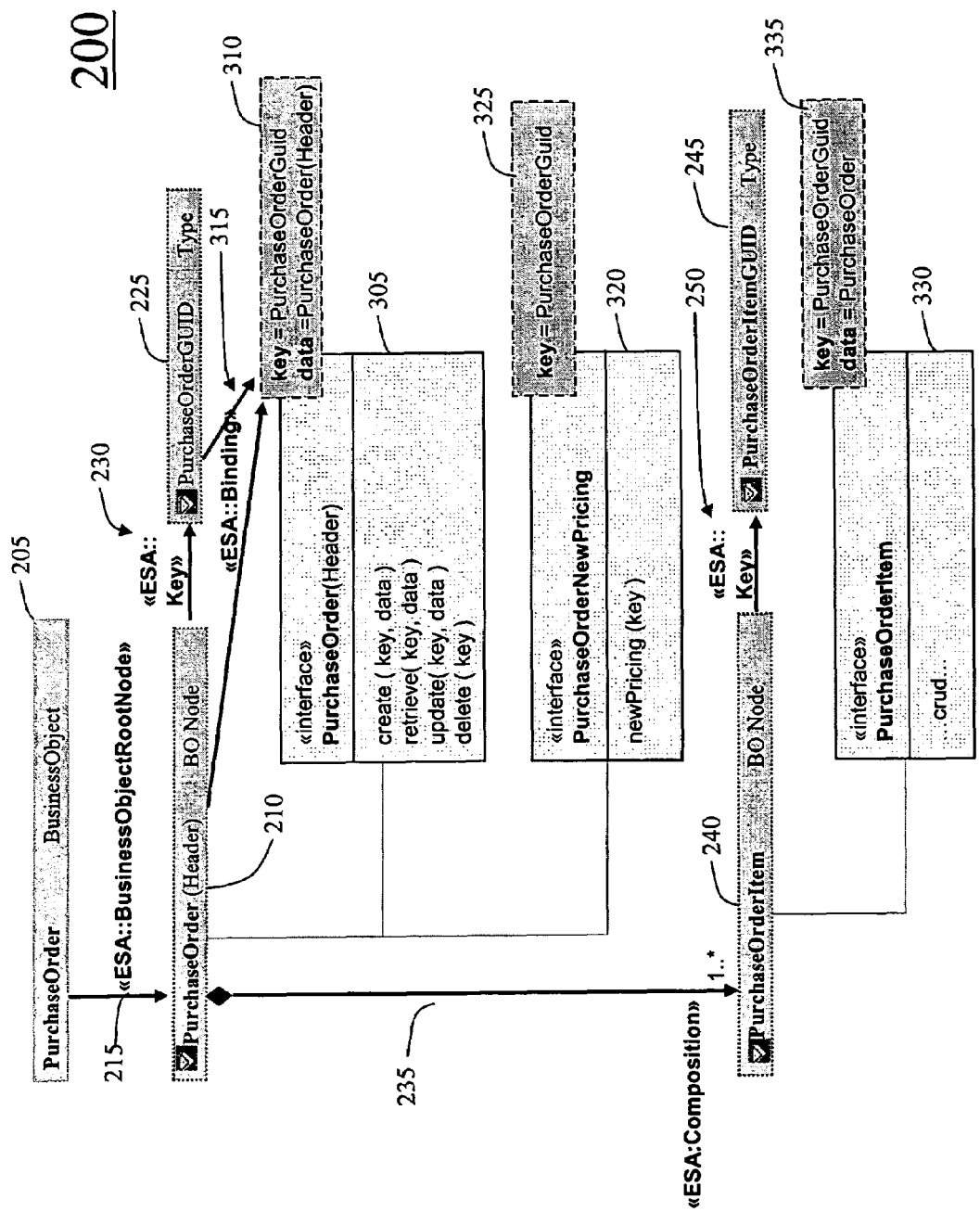
FIG. 3 is an example of a business object model that includes interface patterns.

As shown in FIG. 3, the business object model 200 further includes instances of interface patterns associated with the business object nodes 210 and 240. A purchase order header CRUD interface 305, which is derived from a CRUD interface pattern 165(1) (see FIG. 1), is associated with the purchase order header node 210. Parameters 310 for operations (e.g., create, retrieve, update, and delete) within the purchase order CRUD interface 305 are obtained from the purchase order header node 210 and its associated key 225 and are used in a binding 315 to access the purchase order CRUD interface 305. A purchase order new pricing interface 320, which is derived from an action interface pattern 165(4) (see FIG. 1), is also associated with the purchase order header node 210. Parameters 325 for operations (e.g., new pricing) within the purchase order new pricing interface 320 are obtained from the key 225 associated with the purchase order header node 210 and are used in a binding (not shown) to access the purchase order new pricing interface 320. A purchase order item CRUD interface 320, which is derived from a CRUD interface pattern 165(1) (see FIG. 1), is associated with the purchase order item node 240. Parameters 335 for operations within the purchase order new pricing interface 330 are obtained from the purchase order item node 240 and its associated key 245 and are used in a binding (not shown) to access the purchase order item CRUD interface 330.

Figure 4:
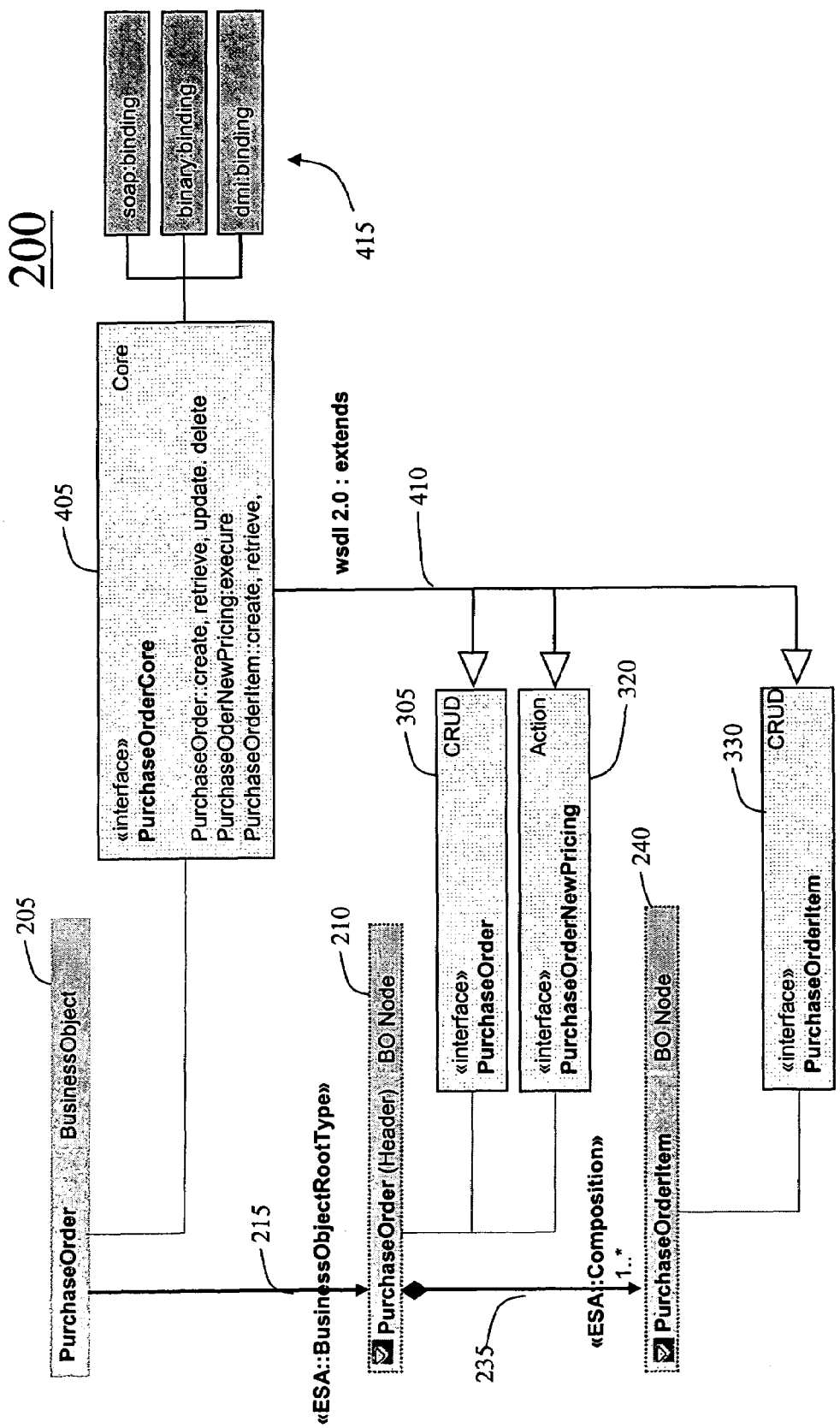
FIG. 4 is an example of a business object model that further includes a pattern based interface.

As shown in FIG. 4, the business object model 200 further includes a pattern based interface 405 associated with the business object 205. The pattern based interface 405 implements core services corresponding to the core service interfaces 305, 320, and 330 for each of the business object nodes 210 and 240 included in the business object 205. The pattern based interface 405 is constructed through a WSDL extends mechanism 410 that refers to each of the core service interfaces 305, 320, and 330 for the business object nodes 210 and 240. Through the use of the WSDL extends mechanism 410, the pattern based interface 405 allows the included core service interfaces 305, 320, and 330 to share the same session. The pattern based interface 405 is accessible through bindings 415 that are specific to different message formats and transmission protocols (e.g., SOAP, binary, and DMI).

Figure 5:
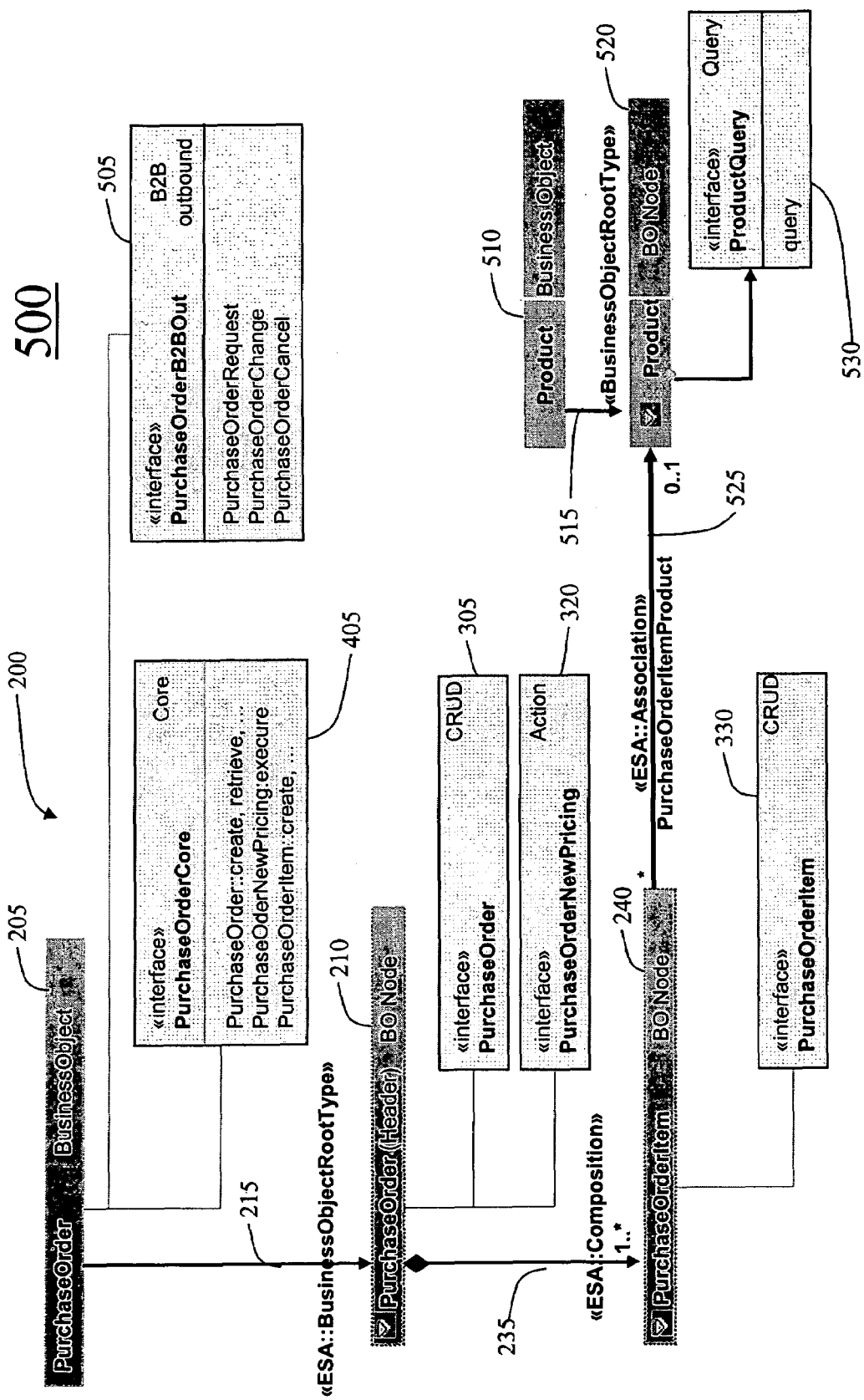
FIG. 5 is an example of a business message model.

As shown in FIG. 5, the business object model 200 is incorporated in a business message model 500. The business message model 500 includes a business message interface 505, which is associated with the business object 205. The business message interface 505 can be an instance of a pattern based interface 170 (see FIG. 1) or can be specially developed for the business object 205. In either case, the business message interface 505 can incorporate the pattern based interface 405 and/or core service interfaces 305, 320, and 330 for the business object nodes 210 and 240. In addition, parameters for the business message interface 505 can be obtained from the business object node graph. In the illustrated example, the business message interface 505 includes operations for sending various messages relating to a purchase order (e.g., a purchase order request message, a purchase order change message, and a purchase order cancel message). Data for the messages is derived from the data structure of the purchase order business object 205 (i.e., from the various business object nodes 210 and 240 that together define the business object 205). This data can be retrieved, in accordance with operations included in the business message interface 505, using the core service interfaces 305, 320, and 330 for the business object nodes 210 and 240 to generate the message.

In addition, purchase order item nodes 240 within the business object 205 are associated with a product business object 510 that defines a product included in each purchase order item node 240. The product business object 510 includes a business object root node association 515 with a product header node 520 that defines data types for the product business object 510. The purchase order item node 240 is associated with the product header node 520 through an aggregation association 525. The product header node 520 can also include core service interfaces such as a query interface 530. Data for a business message defined by the business message interface 505 can also be derived through the association 525 between the purchase order item node 240 and the product header node 520 using query interfaces or relation interfaces included in the purchase order business object 205.

Figure 6:
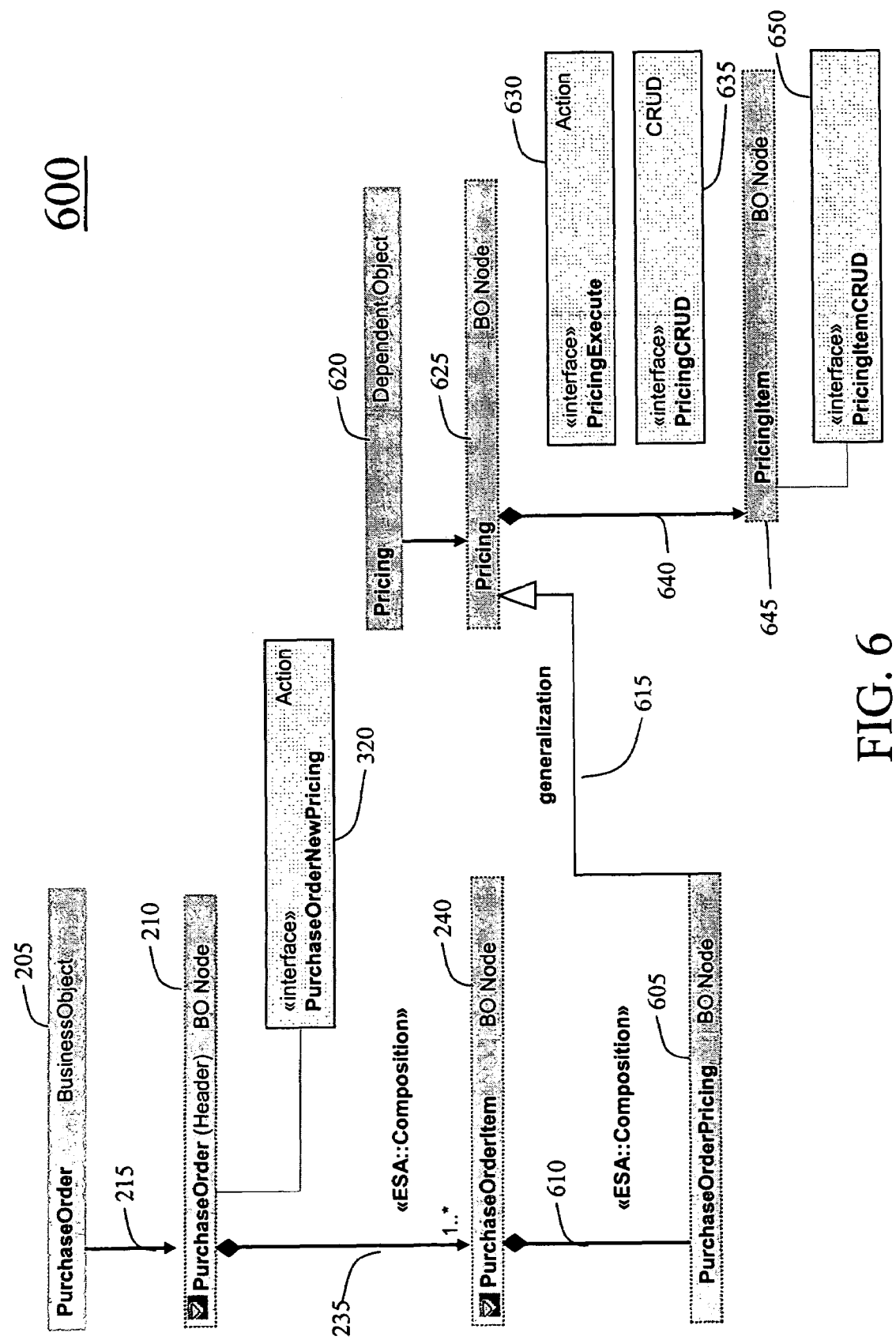
FIG. 6 is an example of a dependent business object.

As shown in FIG. 6, business object nodes 210 and 240 can be a specific instance of generalized business object nodes. In this example, a business object node 240 can include a composition association 610 with subordinate business object nodes 605. A subordinate business object node 605 can be associated with a dependent object 620 through a generalization association 615. The dependent object 620 defines its own tree of business object nodes 625 and 645 through associations 640 and its own core services 630, 635, and 650. The dependent object is a reusable object node that provides the structure and data types included in the subordinate business object node 605.

Figure 7:
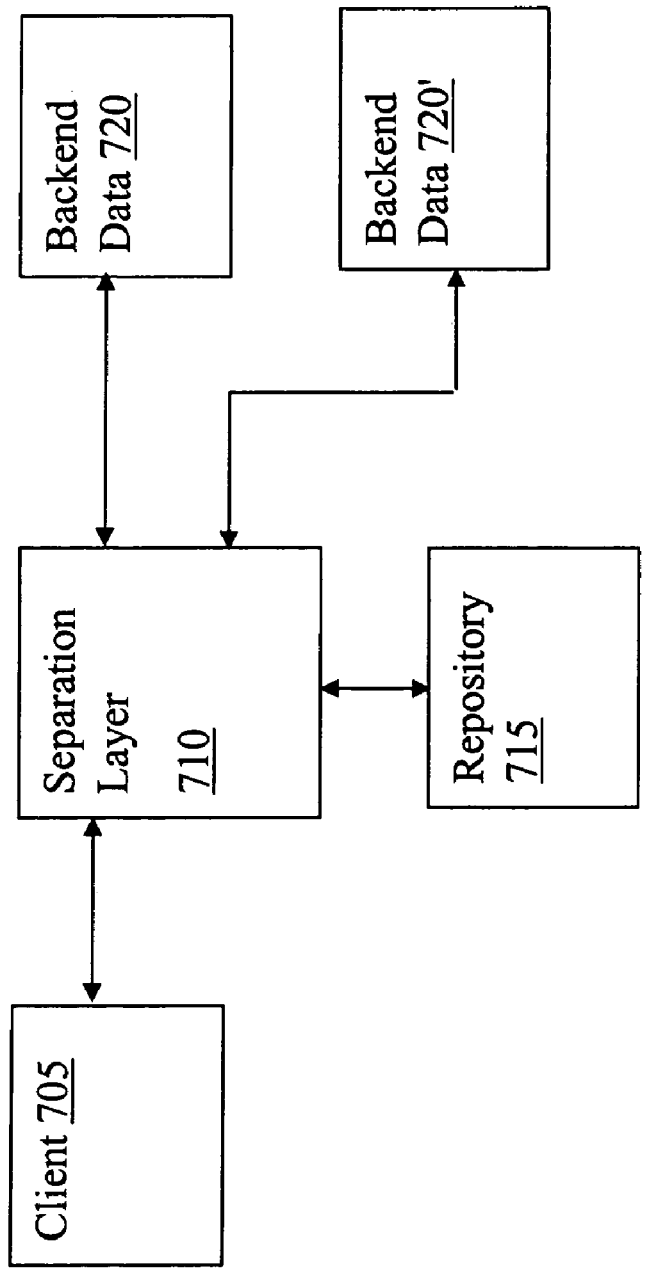
FIG. 7 is a block diagram of a logical representation for a business software architecture.

As shown in FIG. 7, a business software architecture 700 includes a client 705, a separation layer 710, a repository 715 and backend data 720 and 720'. The business software architecture 700 can be used to implement the service meta model described above. The client 705 provides a front end user interface (UI) that enables a user to interact with the backend data 720 and/or 720'. The backend data 720 and 720' can be associated with different backend applications and/or can be arranged and formatted differently from each other. The separation layer 710 separates the front end user interface provided by the client 705 from the back end data 720 and 720'. This separation enables the client 705 to interact with the backend data 720 and 720' in a consistent and similar manner, regardless of the formatting or application-associated differences between the backend data 720 and 720'. In other words, the separation layer 710 provides a canonical interface to the backend data 720 and 720' so that the client 705 is configured to interact with the separation layer 710 and only needs to be updated if the separation layer 710 changes. Changes to the backend data 720 and 720' do not necessitate an update to the client 705. Further, the separation layer 710 is scalable and configured to handle changes and growth to backend data 720 and 720 and any other disparate backend data and backend services that are further connected to the separation layer 710.

As described in more detail below, the separation layer 710 is based on a meta model, such as the meta model shown in FIG. 1, that defines how backend data (e.g., 720 and 720') are represented in the separation layer 710. Metadata is stored in the repository 715 that describes how the backend data 720 and 720' fit into the meta model representation. The client 705 interacts with backend data 720 and 720' using a generic command set defined by the separation layer 710. As described in more detail below, the separation layer 710 accesses service providers that perform the generic commands from the client 705, using the metadata in the repository 715, to effect the requested manipulation of the backend data 720 and 720'. The service providers are configurable so that different service providers can be used for different backend data 720 and 720'. The separation layer 710 includes an interface (e.g., a service manager) that hides the characteristics of the corresponding backend data 720 and 720' and also the service implementation details (i.e., the service providers).

Figure 8:
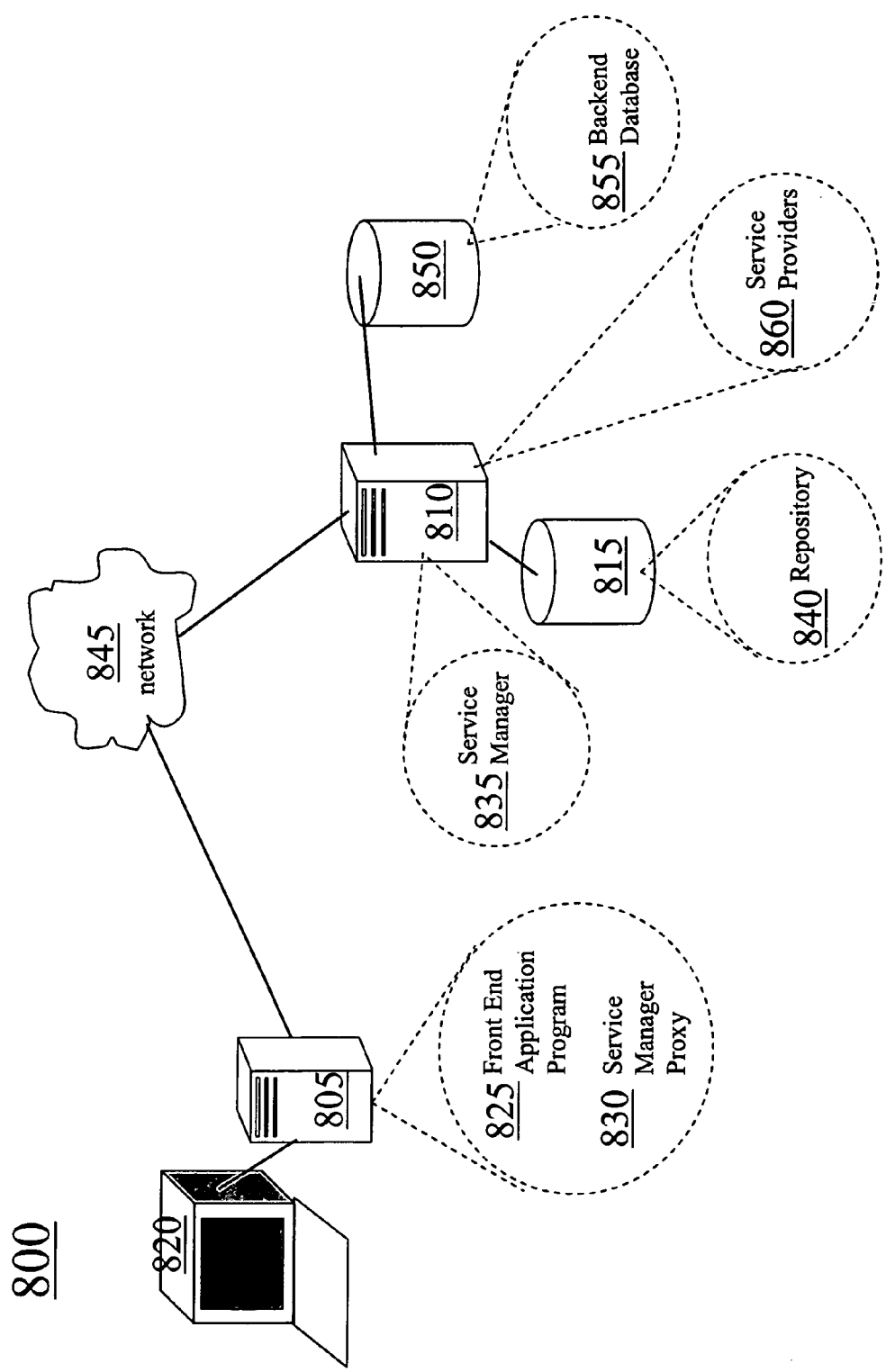
FIG. 8 is a block diagram illustrating an example implementation of a business software architecture.

FIG. 8 illustrates an example implementation of a business software architecture 800. As shown in FIG. 8, the business software architecture 800 includes a first computer 805 and a second computer 810. The computers 805 and 810 each can include a processor, a random access memory (RAM), a program memory (for example, a writable read-only memory (ROM) such as a flash ROM), a hard drive controller, a video controller, and an input/output (I/O) controller coupled by a processor (CPU) bus. The computers 805 and 810 can be preprogrammed, in ROM, for example, or the computers 805 and 810 can be programmed (and reprogrammed) by loading a program from another source (for example, from a floppy disk, a CD-ROM, or another computer) into a RAM for execution by the processor. The hard drive controller is coupled to a hard disk suitable for storing executable computer programs, including programs embodying the present invention, and data. The I/O controller is coupled by an I/O bus to an I/O interface. The I/O interface receives and transmits data in analog or digital form over communication links, e.g., a serial link, local area network, wireless link, or parallel link. Also coupled to the I/O bus are a display and a keyboard. Alternatively, separate connections (separate buses) can be used for the I/O interface, display, and keyboard.

A network 845 connects the computers 805 and 810. The network 845 is any form or medium of digital data communication, e.g., a communication network. Examples of the communication network 845 include a local area network ("LAN") and a wide area network ("WAN"), e.g., the Internet.

The first computer 805 executes instructions of a front end application program 825. The application program 825 represents a front end component of the business software architecture 800. A service manager 835, running on the second computer 810, is a service layer between the front end application program 825 and a set of back end service providers 860. The service manager 835 provides a service interface to the front end application program 825 to enable indirect interaction with the set of back end service providers 860 running on the second computer 810. This service interface allows for a partial separation of software development for the front end application program 825 and the set of back end service providers 860.

The second computer 810 includes a data storage device 850 that stores a back end database 855 containing data that can be used by the set of back end service providers 860. The second computer 810 also includes a data storage device 815 containing an information repository 840 that defines and describes the services provided by the set of back end service providers 860. The metadata in the repository 840 is organized according to a meta model, such as the meta model illustrated in FIG. 1.

The front end application program 825 can access the contents of the repository 840 via the service manager 835. These services support the functionality of the application program 825 and include retrieving and reading data in addition to modifying stored data. The service providers 860 can access or modify stored data in the backend database 855 to provide services to the front end application program 825. To provide the services, the set of back end service providers 860, upon request from the front end application program 825, either access or modify stored data in the backend database 855 or calculate new data.

The repository 840 defines a syntax for requesting services provided by the set of back end service providers 860 and semantically describes the services. As front end application program 825 executes, the front end application program 825 can use this syntax and semantic description from the repository 840 (accessed through the service manager 835) to determine what services the front end application program 825 can use to meet its requirements. This syntax and semantic description for stored or computed backend data can be referred to as "metadata". This stored or computed backend data is conceptually organized using object-oriented structures, such as business objects, where each business object is an instance of a class or data entity type. In one example, a class of business objects can be thought of as a relational database table where each row of data in the table represents the data for a particular business object. In this example, each field in the table represents an attribute of the business object class. In another example, there is a class of business objects that partially refers to a relational database table such that some of the fields in the table represent attributes of the business object class and other fields are computed upon request.

In the business software architecture 800, services provided to the front end application program 825 are focused on data (i.e., data-centric) so the description of these services in the repository 840 is also data-centric. Thus, the metadata in the repository 840 is structured around representations of classes of these business objects. This metadata includes aspects, or descriptions of these representations of business object classes, and descriptions of available operations on aspects such as create, retrieve, update, and delete that are provided by the service providers 860. Each description of these aspects includes data attributes as well as actions that can be requested to be executed by the set of backend service providers 860 on instances of these aspects.

Classifications of data, relations between data classes, prebuilt queries for accessing data, and other descriptions of data provided by the set of backend service providers 860 are represented by the repository 840. This representation, or metadata, of data (e.g., stored in the backend database 855) provided by the set of backend service providers 860 describes different abstract types or classes of data in the backend database 855 and how different data classes relate to each other. Objects are instances of these different abstract types. Metadata is information about data rather than content of the data. The metadata also defines a set of pre-built queries that can be executed on the data in the backend database 855.

The semantic description in the repository 840 can enable the front end application program 825 to determine which services to request from the service manager 835. These services often take the form of requesting data to display. The front end application program 825 reads the metadata in the repository 840 and can flexibly request data organized in different ways that are specified by the metadata. For example, two service managers 835 with two different repositories 840 handle services that determine prices of books for companies A and B. For A and B, book prices are represented by different aspects with different data fields. The front end application program 825 reads A's repository 840 to obtain descriptions of data (including a price) concerning a particular book from A's service providers 860. The front end application program 825 reads B's repository 840 to obtain descriptions of data (including a price) concerning a particular book from B's service providers 860. The front end application program 825 is able to request and display the information from A's service provider 860 and the information organized differently from B's service provider 860 to present the book price information to a user.

During execution, the front end application program 825 issues service requests to the service manager 835, the service manager 835 checks the requests for consistency with the metadata in the repository 840, and then the service manager 835 passes the requests to the back end service providers 860 according to the metadata in the repository database 840. The manner of implementing the set of back end service providers 860 and data in the database 855 is independent of the application 825, with the back end service providers 860 and data in the database 855 conforming to the definitions and descriptions of the metadata in the repository 840. The database 855 can be a relational database. However, the database 855 can be modified to use a different mode of data organization other than a relational database and the front end application program 825 does not need to be modified if the back end service providers 860 and data in the database 855 still conform to the metadata in the repository 840. One such different mode of data organization for the database 855 can be an object-oriented database.

The front end application program 825 provides user interfaces displayed on a monitor 820. The front end application program 825 provides application code to display and aggregate the data received from the set of backend service providers 860. The front end application program 825 generates requests, via the service manager 835, to the set of backend service providers 860 for standard operations such as select, insert, update, delete, and execute in addition to more specialized operations. The front end application program 825 is interaction-centric, focused on aggregating data of the back end service providers 860 and combining interactive steps into a flow of screens and syndicated screen elements.

The front end application program 825 contains screen-flow logic of User Interface (UI) oriented applications and the front end application program 825 binds a UI to the metadata in the repository 840. The front end application program 825 can be indirectly bound to a specific set of backend services by the back end service providers 860 using descriptions of the services in the metadata of the repository 840. The front end application program 825 can also be formed from various generic interaction-centric front end layers that are only bound by configuration to a highly standardized service layer by the service manager 835 serving as an intermediary to the back end service providers 860.

In some implementations, a service manager proxy 830 gives the front end application program 825 a buffered access to a service interface provided by the service manager 835. The service manager proxy 830 is a server on the first computer 805 that acts as an intermediary between the front end application program 825 and the service manager 835 so that the business software architecture 800 can ensure security, administrative control, and caching service.

Figure 9:
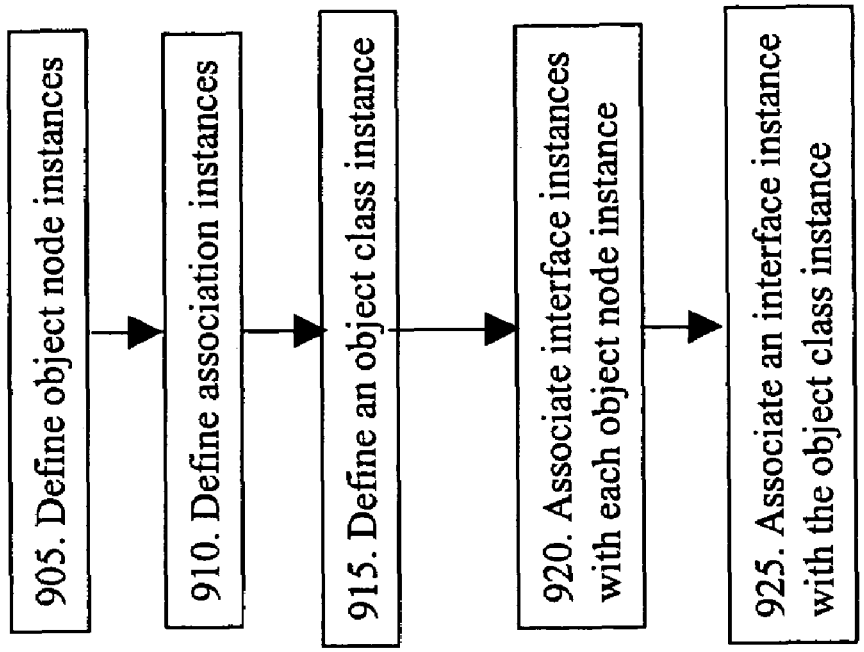
FIG. 9 is a flow diagram of a process for defining a service-based application architecture.

FIG. 9 is a flow diagram of a process 900 for defining a service-based application architecture. Instances of an object node class are defined (905). Each instance of the object node class includes a key identifier and represent data types. Instances of an association class are defined (910). Each instance of the association class represents an association between instances of the object node class. An instance of an object class is also defined (915). The object class instance is associated with the object node class instances that have associations represented by the association class. An instance of an interface class is associated with each of the object node class instances (920). The interface class includes one or more operations relating to the associated object node class instance. The interface class includes interface patterns that describe reusable interface templates. An instance of the interface class is also associated with the object class instance (925). The interface class instance associated with the object class instance includes parameters defining interface class instances associated with the object node class instances.

The invention and all of the functional operations described in this specification can be implemented in digital electronic circuitry, or in computer software, firmware, or hardware, including the structural means disclosed in this specification and structural equivalents thereof, or in combinations of them. The invention can be implemented as one or more computer program products, i.e., one or more computer programs tangibly embodied in an information carrier, e.g., in a machine readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the invention, can be performed by one or more programmable processors executing one or more computer programs to perform functions of the invention by operating on input data and generating output. The processes and logic flows can also be performed by, and apparatus of the invention can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The invention can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The invention has been described in terms of particular embodiments, but other embodiments can be implemented and are within the scope of the following claims. For example, the operations of the invention can be performed in a different order and still achieve desirable results. As one example, the process depicted in FIG. 9 does not require the particular order shown, or sequential order, to achieve desirable results (e.g., the operations 905, 910, and 915 can be performed at many different places within the overall process). In certain implementations, multitasking and parallel processing may be preferable. Other embodiments are within the scope of the following claims.

What is claimed is:

1. A computer program product, tangibly embodied in a machine-readable storage device having instructions that cause data processing apparatus to develop applications by processing data conforming to a data model, the data model comprising:
   an object node class including a key identifier, the object node class representing data types;
   an association class associated with the object node class, the association class representing an association between instances of the object node class;
   an interface class associated with the object node class, the interface class including at least one operation relating to at least one instance of the object node class;
   an object class associated with an object composition, the object composition defined by a data structure of instances of the object node class and associations between the instances of the object node class represented by the association class;
   a core service interface class including at least one operation, the core service interface class associated with the object node class and representing a set of interface patterns; and
   a service interface class including at least one operation, the service interface class associated with the object class and the service interface class representing a service interface constructed from at least one instance of the core service interface class associated with at least one instance of the object node class included in the object composition.

2. The computer program product of claim 1 wherein an instance of the service interface class includes parameters defining the at least one instance of the object node class and the at least one instance of the core service interface class.

3. The computer program product of claim 1 wherein the service interface class includes at least one interface pattern.

4. The computer program product of claim 1 wherein the service interface class comprises an extension of the core service interface class.

5. The computer program product of claim 1 wherein each interface pattern in the set of interface patterns includes a reusable interface template.

6. A method for defining a service-based application architecture, the method comprising:
   defining a plurality of instances of an object node class, the object node class including a key identifier and representing data types;
   defining at least one instance of an association class representing an association between instances of the object node class;
   defining an instance of an object class associated with instances of the object node class having associations represented by the association class; and
   generating an association between at least one instance of an interface class and each of the plurality of instances of the object node class, the interface class comprising:
      at least one operation relating to an associated instance of the object node class;
      a core service interface class including at least one operation;
      an instance of the core service interface class associated with at least one instance of the object node class, the instance of the core service interface class representing an interface pattern selected from the group consisting of an interface pattern for creating instances of the business object node class; and a set of interface patterns for:
- retrieving instances of the business object node class;
- updating instances of the business object node class;
- deleting instances of the business object node class;
- performing an action on instances of the business object node class;
- searching for instances of the business object node class; and
- navigating between instances of the business object node class.

7. The method of claim 6 wherein the interface class comprises interface patterns describing reusable interface templates.

8. The method of claim 6 further comprising associating an instance of an interface class with the instance of the object class, wherein the interface class instance associated with the object class instance comprises additional interface class instances associated with the plurality of object node class instances.

9. The method of claim 8 wherein the interface class instance associated with the object class instance comprises at least one parameter defining the additional interface class instances associated with the plurality of object node class instances.

10. The method of claim 9 wherein the additional interface class instances associated with the plurality of object node class instances comprise instances of a core service interface class, the core service interface class representing a set of reusable interface templates.

11. The method of claim 6 wherein each instance of the object node class includes at least one attribute.

12. The method of claim 6 wherein at least one instance of the object node class comprises a generalization of a reusable instance of the object node class.

13. A system for developing applications, the system comprising a storage device having instructions that cause data processing apparatus to store data conforming to a data model, the data model comprising:
- an object node class including a key identifier, the object node class representing data types;
- an association class associated with the object node class, the association class representing an association between instances of the object node class;
- an interface class associated with the object node class, the interface class including at least one operation relating to at least one instance of the object node class;
- an object class associated with an object composition, the object composition defined by a data structure of instances of the object node class and associations between the instances of the object node class represented by the association class;
- a core service interface class including at least one operation, the core service interface class associated with the object node class and representing a set of interface patterns; and
- a service interface class including at least one operation, the service interface class associated with the object class and the service interface class representing a service interface constructed from at least one instance of the core service interface class associated with at least one instance of the object node class included in the object composition.

14. The system of claim 13 wherein an instance of the service interface class include parameters for the instance of the service interface class, the parameters defining the at least one instance of the object node class and the at least one instance of the core service interface class.

15. The system of claim 13 wherein each interface pattern in the set of interface patterns include a reusable interface template.

* * * * *